United States Patent

[11] 3,603,846

| | | |
|---|---|---|
| [72] | Inventor | Tibor Endre Toth<br>Bloomfield, N.J. |
| [21] | Appl. No. | 822,202 |
| [22] | Filed | May 6, 1969 |
| [45] | Patented | Sept. 7, 1971 |
| [73] | Assignee | Union Carbide<br>New York, N.Y. |

[54] CURRENT DETECTOR CIRCUIT
9 Claims, 2 Drawing Figs.

[52] U.S. Cl. .................................................. 317/123,
219/69 S, 317/148.5, 317/DIG. 5
[51] Int. Cl. ........................................................ H01h 47/32
[50] Field of Search............................................. 317/31, 27,
33, 123 D, 148.5; 324/126; 219/69 C, 69 S, 131,
497, 501; 307/235

[56] References Cited
UNITED STATES PATENTS

| 2,882,522 | 4/1959 | Pearlman ..................... | 317/123 D |
|---|---|---|---|
| 3,100,833 | 8/1963 | Ritter et al. .................... | 317/123 D |
| 3,439,229 | 4/1969 | Ingle ............................. | 317/148.5 |
| 3,513,353 | 5/1970 | Lansch ......................... | 317/31 |

FOREIGN PATENTS

| 1,410,640 | 10/1964 | France ......................... | 324/126 |

Primary Examiner—J. D. Miller
Assistant Examiner—Harry E. Moose, Jr.
Attorneys—Paul A. Rose, Thomas I. O'Brien, Dominic J. Terminello and Eugene Lieberstein ABSTRACT: A solid-state current-detector circuit capable of detecting the presence of a predetermined magnitude of AC or DC current in a power cable wherein the current may vary over an extended range which includes means for sensing the voltage drop in a relatively short length of cable which means changes its electrical state when said voltage drop exceeds a predetermined level.

PATENTED SEP 7 1971

3,603,846

INVENTOR
TIBOR E. TOTH
BY
ATTORNEY

CURRENT DETECTOR CIRCUIT

This invention relates to apparatus for detecting the presence or absence of current flow in a power cable adapted to carry large currents.

Industrial processes in which large currents are employed require some means for indicating the presence or absence of current flow. For purposes of the present disclosure, large current is defined as being of the order of at least 5 amperes and may extend to many hundred amperes. In an automated welding or cutting system current has heretofore been detected by mechanical relays. The power line or cable is passed through the relay which is activated by the electromagnetic field generated by the current in the cable. A substantial current in the order of 75 amperes or more is necessary to generate a sufficient electromagnetic field to operate the relay. If the relay is to operate at substantially less than 75 amperes, e.g. 10 amperes, the relay must be integrally connected in series with the power cable. This places a severe limitation on the current capacity of the power cable. At the other extreme, if too much current is fed through the cable the relay may possibly become permanently magnetized. Hence, the operating range of mechanical relays from minimum pull-in current to maximum operating current is limited; the useful range being about 8:1. Moreover, mechanical relays employed to detect current in the above manner are necessarily large, bulky and unwieldy. The art has long sought a solution to the problem of current detection wherein current may be detected regardless of the range of current involved.

It is therefore the principal object of the present invention to provide a nonmechanical detector which is capable of detecting current over a wide operating range.

It is a further object of the present invention to provide a current detector which is capable of detecting the presence of AC or DC current or a combination thereof in a power cable wherein the current magnitude may vary over an extended range.

It is yet a further object of the present invention to provide an economical current-detector circuit for detecting the presence of current flow in a power cable, the circuit being compact and of relatively small size.

Other objects and advantages of the present invention will become apparent from the following detailed description of the invention with reference to the drawings in which.

According to the present invention, detection of the presence of current is accomplished by measuring the voltage developed across a section of cable. The resistance of a given length of cable at a given temperature and resistivity is determined by the product of the inverse of the cross-sectional area of the cable and its length. An increase in cable temperature due to large current flow will cause the resistance thereof to increase proportionally. A voltage of about 4 mv. (millivolts) was detected across a 2-foot section of ⅝-inch O.D. (outside diameter) cable carrying a current of approximately 20 amperes. One could generate a larger voltage by merely examining a greater length of cable. It is also apparent that the voltage generated will vary proportionally with variations in current. Although the present invention may be adapted to measure incremental changes in current flow the primary purposes herein is to distinguish between the existence and nonexistence of current flow above a predetermined level irrespective of the range of current employed.

Figure 1:
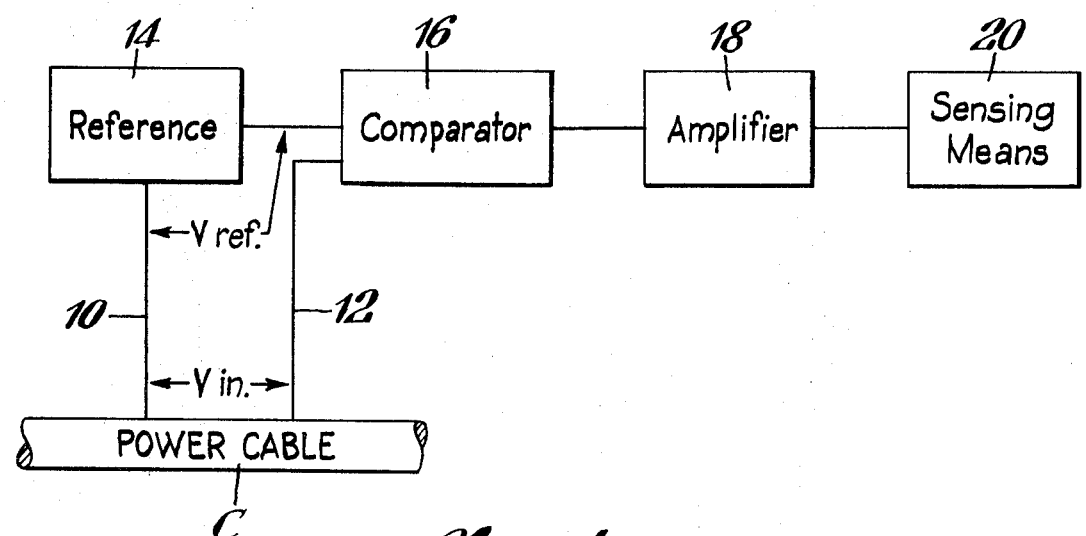
FIG. 1 is a general block diagram illustrating the invention.

Referring now to FIG. 1 wherein power is supplied through the power cable C which is composed of any conducting material such as copper in either solid or stranded form and which is adapted to carry DC or AC current of any desired magnitude. For three-phase AC operation cable C may represent any one of the three-phase lines on the primary side of the power supply or any one of the conductors on the secondary side. Leads 10 and 12 are connected to power cable C at any two arbitrary points along the cable located at a predetermined distance from one another. Although power cables are universally insulated there usually exists an exposed region, generally within the power source or supply to which the cable is connected, of sufficient length to connect probes. Alternatively, the insulation on the cable may be pierced at appropriate points to attach leads 10 and 12. The opposite end of lead 10 is connected to reference source 14. The output of reference source 14 taken with respect to lead 10, hereinafter identified as "Vref," is connected as one input to comparator 16. A second input to comparator 16 is provided by lead 12 also taken with respect to lead 10 and identified as "Vin" in FIG. 1.

The comparator 16 is of conventional design and provides a polarity-controlled output signal responsive to the algebraic difference between "Vin" and "Vref." When "Vin" exceeds "Vref" the output of comparator 16 reverses polarity. The output of comparator 16 is amplified by amplifier 18 and supplied to sensing means 20 which responds to the polarity of the amplified signal for indicating the presence or absence of current flow in power cable C. "Vref" can be set to any potential for increasing or decreasing the sensitivity of comparator 16 with respect to the voltage developed across the section of cable under examination, i.e. "Vin." The voltage "Vin" is directly responsive to the amount of current flowing in cable C and will always be of relatively small magnitude regardless of the level of current flow in the cable. Sensing means 20 includes an integrating circuit of conventional design the purpose of which is to hold in for AC current the output of sensing means 20 for a time longer than the time required for comparator 16 to change state. Thus only the steady-state peak amplitude of the AC current will determine the state of the output.

Figure 2:
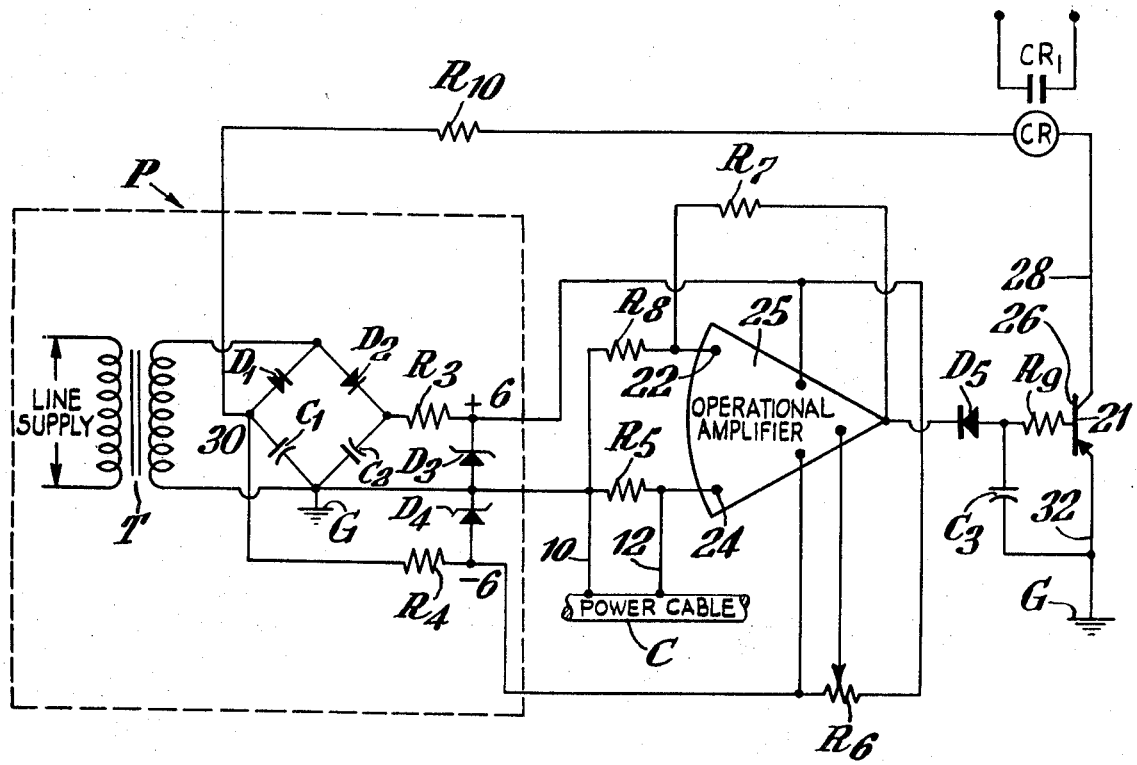
FIG. 2 is a schematic circuit diagram of a preferred arrangement for carrying out the invention being partly shown in block form.

Referring now more particularly to the preferred arrangement illustrated in FIG. 2 in which is shown a current-detector circuit designed to indicate the presence or absence of current flow in power cable C above an arbitrarily chosen level of 20 amperes. Leads 10 and 12 are electrically connected to power cable C and placed approximately 2 feet apart. A resistor R5 which may be as low as 1 ohm is connected across leads 10 and 12 to suppress noise by offering an extremely low impedance thereto. Lead 12 is connected to input terminal 22 of operational amplifier 25. Operational amplifier 25 is intended to replace the function of comparator 16, amplifier 18 and reference source 14 of FIG. 1. The operational amplifier 25 is of conventional design, operating as a level detector using external positive feedback to produce hysteresis in the transfer characteristics. The reference potential for the operational amplifier 25 is obtained by biasing the operational amplifier 25 into positive saturation and feeding back part of the output voltage to provide a predetermined reference potential at input terminal 22. Resistors R7 and R8 determine the gain of the amplifier and are also used as the feedback network to establish the reference potential. Power is supplied to the operational amplifier by stepping down line voltage from a 115-volt supply to approximately 6.3 volts (RMS) by means of stepdown transformer T. The 6.3-volt secondary of the stepdown transformer T is applied to a voltage doubler circuit which comprises D1, D2, C1 and C2, the unregulated output of which is thereafter applied to a complementary connected pair of zener diodes D3 and D4 through equal resistors R3 and R4, respectively, to provide a regulated DC output of plus and minus 6 volts for the operational amplifier 25.

Operational amplifier 25 is initially biased into positive saturation by short-circuiting input leads 10 and 12 and varying potentiometer R6 until a voltage of approximately plus 4 volts (arbitrarily selected) is measured at the output. The reference potential at terminal 22 of operational amplifier 25 will equal approximately R7/R8 times the output voltage. When the voltage developed across leads 10 and 12 at input terminal 24, due to the current in cable C, exceeds the reference potential, the operational amplifier 25 is caused to switch from a normally positive saturated state to a negative saturated state. The magnitude of the output voltage for negative saturation is substantially the same as that for positive saturation. A current of 20 amperes in power cable C will develop a voltage of about 4 mv. across leads 10 and 12 when separated approximately 2 feet apart. Hence, resistors R7 and R8 need only be adjusted to provide a 4 mv. reference potential to render 20 amperes the lower limit of detection. There is in fact no practical upper limit of cable current which could be injurious to the system. When the current drops below 20 amperes the operational amplifier will reverse back to positive saturation.

The output of operational amplifier 25 is fed to a diode D5 capacitor C3 combination and in turn into the base 26 of switching transistor 21 through a series resistance R9. The collector 28 of transistor 21 is connected through relay CR, and current-limiting resistor R10 to terminal 30 between diode D1 and capacitor C1, i.e. to the unregulated side of the power supply P. The emitter 32 of transistor 21 is connected to the common ground G of the system. Switching-transistor 21 is normally off. When the output of the operational amplifier 25 switches to —4 volts, transistor 21 switches to the "on" state energizing relay CR which in turn closes contact CR1 of relay CR to give an isolated output representing the presence of a predetermined amount of current in cable C.

If an alternating current of sufficient magnitude is passed through cable C the output of operational amplifier 25 will alternate between + and =4 volts. Diode D5 and capacitor C3 act as an integrating circuit where the charging-time constant is much smaller than the discharging-time constant. Hence, for AC current capacitor C3 will maintain a sufficient charge to keep transistor 21 in the "on" state. This permits relay CR to hold in on AC currents as well as DC currents or in fact a combination of both AC and DC currents.

In FIG. 1 a reference source has been shown to provide a predetermined reference voltage while in FIG. 2 a reference level was established by feedback means. For purposes of the present invention a reference voltage or level is intended by definition to embrace any threshold voltage or level which once reached will ultimately indicate the presence or absence of a predetermined amount of current in power cable C.

While the invention has been described in connection with the specific circuitry shown and described, it is apparent that many modifications may be made by those skilled in the art without departing from the underlying scope of the invention. One such modification that may be made would be to substitute a conventional Schmitt trigger and flip-flop for the circuit shown where the Schmitt trigger would fire in response to a predetermined pickup voltage activating the flip-flop for indicating the presence of a predetermined amount of current. It is, therefore, intended that the appended claims cover all such modifications which fall within the spirit and scope of the present invention.

What is claimed is:

1. A welding current detector circuit for detecting the presence of welding current above a predetermined level in a welding power cable comprising:
    a reference voltage source having a common reference lead connected to the welding power cable and an output lead for supplying a predetermined potential with respect to the reference lead; comparator means having a first input connected to said output lead and a second input connected to said welding cable at a predetermined distance from the connection of said common reference lead, resistance means of very low magnitude connected to said reference lead and to said second input, said comparator means providing a polarity-sensitive output signal in response to the algebraic difference between said predetermined potential and the voltage developed at said second input and sensing means responsive to the polarity of said comparator output signal for indicating the presence or absence of a predetermined level of current flow in the welding power cable.

2. A welding current detector circuit as defined in claim 1 wherein said comparator means is an operational amplifier, the output polarity of which is controllably alternated between positive and negative saturation in response to the algebraic difference between the first and second inputs thereto.

3. A welding current detector circuit as defined in claim 2 wherein the output signal of said operational amplifier is of normally positive polarity and reverses to negative polarity when the voltage developed at the second input exceeds the reference potential supplied to the first input.

4. A welding current detector circuit as defined in claim 3 wherein the reference voltage source is developed by a feedback network connecting the output of the operational amplifier to the first input thereof and to the common reference lead connected to the welding power cable.

5. A welding current detector circuit as defined in claim 4 wherein the feedback network is resistive and also determines the gain of the operational amplifier.

6. A welding current detector circuit as defined in claim 1 wherein said sensing means comprises a transistor which is forward biased for a given output polarity of the comparator means and reverse biased for the opposite output polarity.

7. A welding current detector circuit as defined in claim 6 wherein relay means is connected in series with the collector of said transistor and is actuated when said transistor is forward biased.

8. A welding current detector circuit as defined in claim 1 wherein said sensing means further includes an integrating circuit for rectifying the alternating changes in the output polarity of the comparator means when said welding power cable carries alternating current.

9. A welding current detector circuit as defined in claim 1 wherein the output polarity of said comparator means is reversed in response to an input signal thereto of at least 4 mv. representing at least 20 amperes of current in said power cable.